March 24, 1936.  H. SCHNEIDER  2,035,096
ENGINE ACCESSORY DRIVE
Filed Feb. 2, 1934    7 Sheets-Sheet 1

Fig. 1.

INVENTOR.
HEINRICH SCHNEIDER
BY
Roy M Eiler
ATTORNEY.

March 24, 1936.  H. SCHNEIDER  2,035,096
ENGINE ACCESSORY DRIVE
Filed Feb. 2, 1934   7 Sheets-Sheet 2

INVENTOR.
HEINRICH SCHNEIDER
BY
ATTORNEY.

March 24, 1936.  H. SCHNEIDER  2,035,096

ENGINE ACCESSORY DRIVE

Filed Feb. 2, 1934  7 Sheets-Sheet 3

INVENTOR.
HEINRICH SCHNEIDER
BY
ATTORNEY.

March 24, 1936.  H. SCHNEIDER  2,035,096

ENGINE ACCESSORY DRIVE

Filed Feb. 2, 1934   7 Sheets-Sheet 6

INVENTOR.
HEINRICH SCHNEIDER
BY
ATTORNEY

Patented Mar. 24, 1936

2,035,096

UNITED STATES PATENT OFFICE 2,035,096

ENGINE ACCESSORY DRIVE

Heinrich Schneider, Beloit, Wis., assignor to Fairbanks, Morse & Company, Chicago, Ill., a corporation of Illinois Application February 2, 1934, Serial No. 709,435

16 Claims. (Cl. 74—389)

This invention relates to improvements in engine accessory drives, and more particularly to power or driving connections associated with the usual auxiliaries or auxiliary drive apparatus of reversible internal combustion engines. The present disclosure exemplifies the invention by application of its principles to apparatus for compressing scavenging air in a two-cycle internal combustion engine of reversible type.

An object of the present invention is attained in the provision of an improved driving connection for adjuncts of reversible internal combustion engines, wherein it is necessary or desirable to maintain the direction of rotation of the driven accessory or adjunct, despite reversal of rotation of the engine proper.

A further object of the invention is attained in an improved arrangement and mounting of the driving connections of scavenging air blowers for two-cycle engines.

Yet another object of the invention is attained in an improved mounting of operative engine accessories or adjuncts such that the accessory apparatus, such as a blower, may be applied to or removed from the associated engine as an operative unit.

Yet another object of the invention consists in the provision of a system of automatic clutch units which may be of so-called overrun or unidirectional type, so as automatically to insure a definite predetermined direction of rotation of engine auxiliary apparatus characterized by a plurality of rotating members, such as shafts, operating in timed relation to each other, each in a definite direction of rotation irrespective of reversal of the engine with which the adjunctive or auxiliary apparatus is utilized.

The foregoing and further objects will appear as the description proceeds, and from the accompanying drawings of a presently preferred embodiment of the invention. In the drawings.

Figure 1:
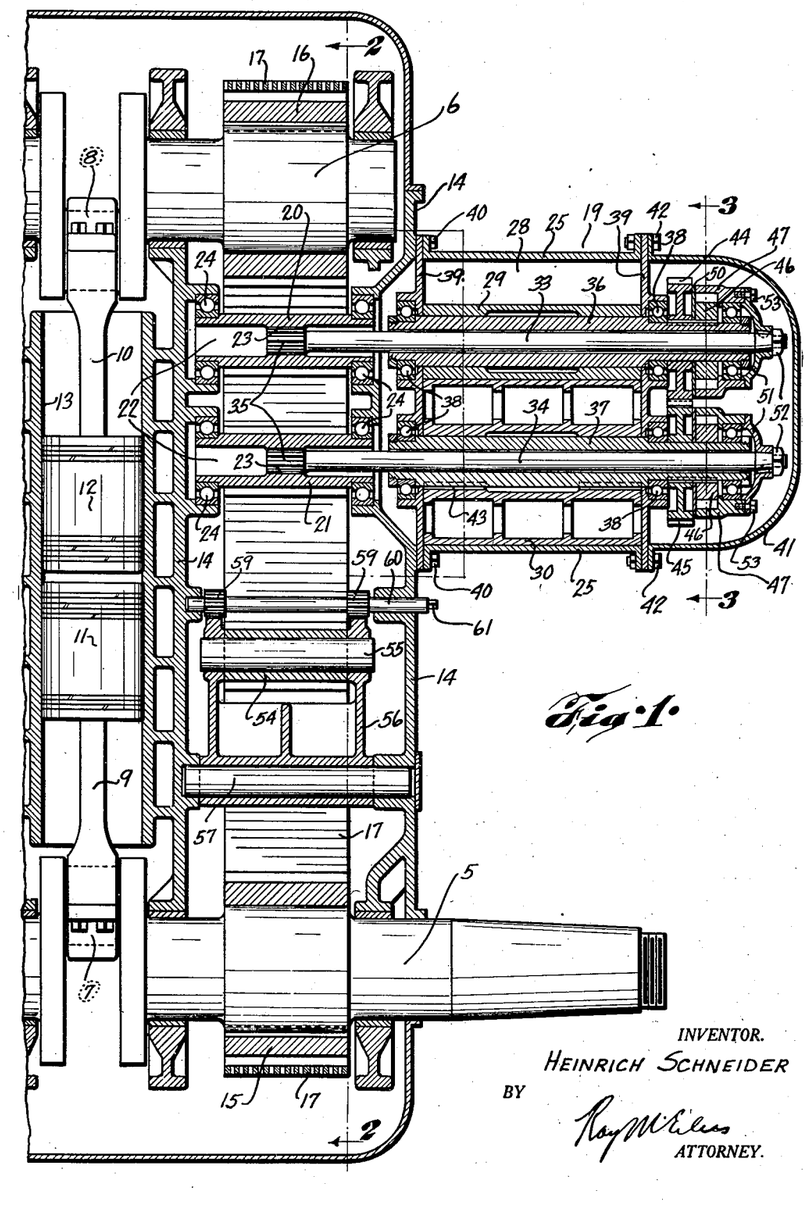
Fig. 1 is an axial section partly in elevation, taken along line 1—1 of Fig. 2, of one end of an internal combustion engine of opposed-piston type, provided with an air blower mounted and driven in accordance with the present invention.

Referring now by numerals of reference to the drawings, Fig. 1 shows the invention as applied to an opposed piston engine employing two crankshafts 5 and 6, the engine being of multicylinder type, although for convenience of illustration only one cylinder is shown. The paired crank pins or throws are indicated respectively at 7 and 8, and are operatively connected, in order, through connecting rods 9 and 10, with pistons 11 and 12. The paired pistons such as 11 and 12 operate in a common cylinder 13, suitably supported in or formed integrally with the engine frame 14, which may also constitute the cylinder block structure.

The crankshafts 5 and 6 are provided respectively with gear or sprocket elements 15 and 16 operatively engaging the chain 17 which is, by preference, of so-called silent type, the chain serving, through the sprockets 15 and 16, to maintain the shafts 5 and 6 in predetermined timed relation even though the engine, which is of reversible type, be rotated in either direction.

Certain of the operative engine auxiliaries, which for present illustration are exemplified by a pair of Roots type blowers indicated generally at 18 and 19, are disposed at one end of the engine, mounted in overhung relation on the engine frame such as 14. There are provided for each blower unit a pair of gear elements or sprockets such as 20 and 21 for the blower 19, a similar pair of sprockets (not shown) being provided for the blower 18. The sprocket elements 20—21 are each provided with an internal bore 22, each bore being internally splined over at least a portion of its length as at 23. The sprockets 20—21 are journalled at their opposite ends as by ball bearings 24 suitably supported in the frame structure 14, in which provision is made for securely positioning the bearings.

Since the operative elements specific to each of the blower units are or may be identical in the two blower units 18 and 19, a description of one unit will suffice for both. It may be noted, however, that both blower units may be mounted in a common housing structure such as 25, provided with a common intake chamber 26 to which the air is initially admitted, whence it proceeds through intake openings 27 into the separate displacement chambers of the units 18 and 19. As the air enters one of the ports 27, and proceeds into one of the displacement chambers such as 28, it is acted upon by the paired impeller elements 29 and 30 by which the air is expelled, according to the course of the arrows in Fig. 2, through a discharge port 31 into a manifold 32. The blower units preferably operate at speeds somewhat higher than engine speeds, and a volume of air under positive pressure is maintained in the manifolds 32 at all times, whence it is admitted by passages (not shown) to the scavenging air ports (not shown) of the several engine cylinders. The operation of blowers of this general type are known in the art, and thought to require no further present description.

A driving connection is effected between the chain 17, actuated by the engine crankshafts, and the impellers 29 and 30 through the agency of a pair of blower drive shafts 33 and 34, each of such shafts being provided with an externally splined driving head such as 35, at its innermost end. The splines of the heads 35 correspond to the internal splines of portion 23 within the sprockets 20 and 21 and constitute the operative connection therewith. Mounted respectively upon the shafts 33 and 34 are sleeves 36 and 37, there being provided, by preference, a substantial clearance between each of shafts 33—34 and its associated sleeve, a clearance also being provided between the mating splined elements, so that the clearances obviate the necessity for unwarranted niceties of dimension and alignment in production machining and assembly. The sleeves are journalled, each at its opposite ends, in ball bearings such as 38, carried in suitable seats formed therefor, either in the walls of the displacement chamber structure, or in suitable bearing arm elements which may constitute extension of such walls as indicated at 39. One of the web or wall portions 39 may be externally extended to form flanges apertured for purposes of mounting the blower unit or units to the frame 14, as through the agency of cap screws or the like 40. The housing for the paired units constituted by the member or members 25 may be also provided with a detachable end closure element 41, secured as by bolts or screws 42 to one of the web or wall elements 39.

Each of the sleeve elements 36 and 37 serves as a mounting for one of the impeller members 29—30, such members being affixed, each to its associated sleeve, as through a key 43. In the present type of unit the paired coacting impeller or displacement members are angularly displaced approximately 90 degrees, and are of course kept in this relatively timed relation. To the end of maintaining this angular relation and for the purpose of enabling each of the sleeve impeller structures to be driven by the other, I have provided a pair of enmeshing gears such as 44, secured to the sleeve 36 as by a key, and 45 similarly secured to the companion sleeve 37. The same key which serves to secure a given one of the gears or pinions 44—45, to its associated sleeve, may also serve operatively to connect an inner overrunning clutch element 46 to the associated sleeve. Concentrically and coaxially overlying each of the inner overrun clutch elements 46, is an outer companion clutch element 47. The inner elements 46 are each provided with one or a plurality of roller pockets 48 of varying depth proceeding peripherally of the member and between the ends of the pocket. These pockets serve to receive, and coact with the companion elements 47 so that each pocket contains a roller 49 which is free to shift or roll endwise of its pocket over a portion of the length of the pocket, but which on approaching the shallow end of the pocket, serves wedgingly to engage the inner periphery of the outer element 47, and the companion inner element 46. Such displacement of the roller 49 takes place under the influence of rolling contact of element 47 with the roller. It is of course understood that balls may be employed in lieu of rollers, which are preferred by reason of their greater area of contact. The outer members 47 are each cupped in form, and of a depth to receive therein, the companion inner member. Closure of the remaining open side of the pocket is conveniently effected by a suitable plane closure element or disc 50.

Secured as by a key to a tapered outer end of each of shafts 33 and 34, is a spider 51, retained in place as by a lock nut 52. The peripheral portions of the spider form seats to receive the outermost portions of the clutch elements 47 to which the spider may be secured as by cap screws 53. The clutch elements 47 are therefore, driven by the shafts 33 and 34 respectively. The operation of the individual overrun clutch or freewheeling elements is thought to be apparent from Figs. 1, 3 and 4, and to require no further description.

Figure 2:
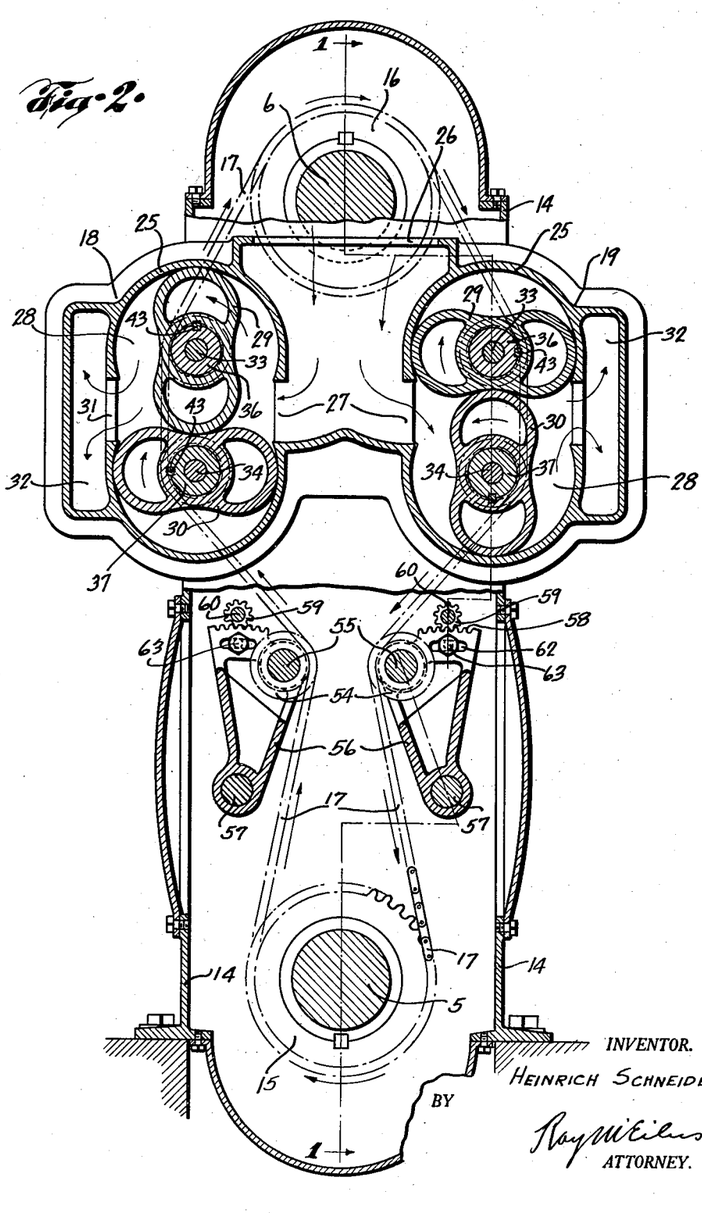
Fig. 2 is a staggered section through the structure of Fig. 1, as viewed along line 2—2 thereof.

While it is of course not unknown to provide an idler element to control the slack in an engine timing chain, it has been found expedient so to locate a pair of such elements, according to the embodiment of Figs. 1 and 2, as at 54. These idler sprockets are each rotatively mounted on a stub shaft 55 carried by a swingable frame 56, pivoted on a pin 57, there being, by preference, two of the elements 56 mounted relatively oppositely so that the idlers 54 are presented to the external faces of the chain. For the purpose of adjusting the angular positions of the frames 56, each frame is provided with a rack surface 58, with which enmeshes a manually rotatable pinion 59, each of such pinions being carried by a shaft 60 which projects from the end of the engine frame 14, and is provided with a squared head 61 for the reception of a wrench or the like, through which the shaft may be rotated for purposes of changing the angularity of the associated idler frame. Each of the frames may be further provided for retention purposes with a slot 62 through which extends a cap screw or bolt 63, serving the purpose of a threaded clamp element.

It will appear from the particular location of the idlers 54, as shown by Fig. 2, that these elements serve not only the purpose of controlling the tension of the chain 17, but also maintain the opposite passes of the chain at substantially the same angularity below the blowers, as prevails above them. It will appear from the drawings that the provision of the idler elements 54 serves materially to augment the arcs of engagement of the chain 17 with the blower drive sprockets 20 and 21, at each side of the double unit.

The operation of the elements identified in the disclosure with the blower and its drive, is thought to be apparent from the foregoing description of parts but may be briefly reviewed as follows:

When the engine is in operation in a given direction, say clockwise as viewed in Fig. 2, the chain 17 will be actuated in the direction of the arrows. Considering the blower unit 18 for example, it appears that, since the chain 17 engages corresponding sides of the gear element such as sprockets 20 and 21, both of these sprockets will be rotated in the same direction. The splined engagement of the sprockets with the shafts 33 and 34 will cause the shafts to rotate, both in the same direction, since the shaft driving sprockets are thus rotated. Since the spiders 51 are keyed to the shafts 33 and 34 and thus positively rotated therewith, the outer elements 47 of the corresponding one-way clutch assemblies will be rotated in the same directions. However, since, as appears from Fig. 3, power will be transmitted under such conditions only through the lower one-way or overrun clutch, the inner element 46 of the upper clutch of this unit being free to rotate independently of the outer element 47. Driving thus takes place under these conditions through shaft 34, directly to actuate, through the associated spider 51 and the lower overrun clutch assembly, the sleeve 37 which serves to drive the lowermost impeller of the blower unit. The uppermost impeller of this unit is rotated necessarily in an opposite direction through engagement of gear 45 with gear 44 secured to the upper impeller element of the unit. The sleeve 36 and associated impeller are free to rotate in a direction opposite of shaft 33, since the parts of the one-way clutch associated with the sleeve 36, are in disengaged condition as appears from the upper lefthand portion of Fig. 3. This is due to the fact that the clockwise movement of the outer element 47 of clutch unit tends to rotate the roller 49 to the deep end of its pocket, and thus the associated parts 47 and 46 are out of operative engagement. A comparison of the corresponding elements of Fig. 3 and Fig. 4 will show that an analogous but opposite situation prevails with respect to the paired overrun clutches, when chain 17 is reversed in direction of movement, responsively to reversal of the engine. According to Fig. 4, when the engine is operating in a counterclockwise direction the outermost elements 47 of the clutches are also rotating counterclockwise. This brings the uppermost one-way clutch, at the left of Fig. 4, into engaged position, and thus as the engine is reversed, driving of the associated blower takes place through the upper clutch, while the lower companion unit is permitted to run free.

Figure 3:
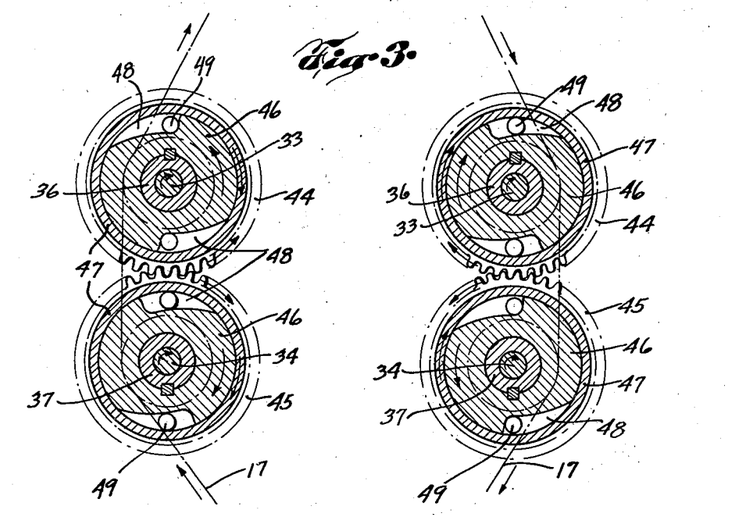
Figs. 3 and 4 are sections each along the plane 3—3 of Fig. 1, illustrating diagrammatically the relation of certain parts of the blower drive as adapted to a reversible engine of the type shown by Figs. 1 and 2.
Figure 4:
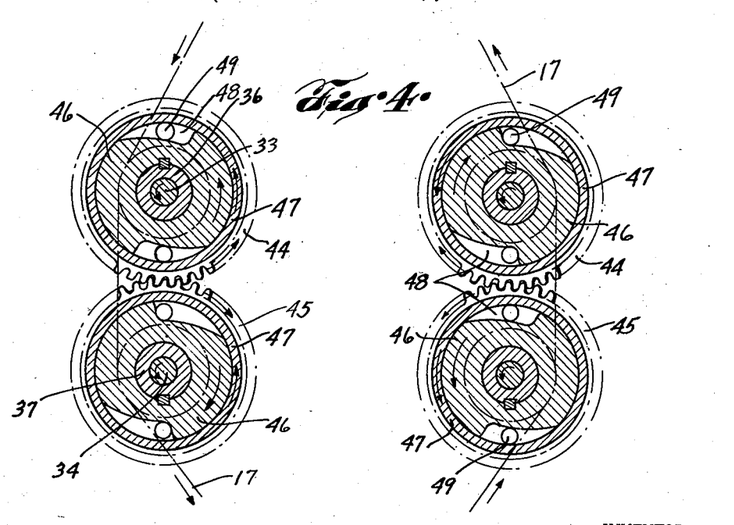

It will appear from Figs. 3 and 4 that, irrespective of direction of rotation of the engine, as shown by the arrows, any given impeller sleeve such as 36 or 37, is always rotated in the same direction. For example, the sleeve 37 of the left hand unit always rotates clockwise in the illustrated example, while the sleeve 36 always rotates counterclockwise, and thus irrespective of engine reversal, the course of the air into and through the blower assembly is always as indicated by the dotted arrows of Fig. 2. While the operation of the drive elements of only one blower has been described, it will be understood that an analogous situation prevails as to the similar elements of the companion blowers with the difference that when driven, as illustrated, the overrun clutches will be reversely positioned, due to engagement of the chain with the opposite side of the blower driving sprockets such as 20—21 on the right hand side of the engine, as compared to those on the left hand side.

A distinct advantage in assembly and maintenance results from the described mounting of the blower, which best appears from Fig. 1. It will appear that the casing 25 serves to contain, in operatively assembled relation, all parts of the blower and blower drive except for the gear or sprocket elements 20—21 journalled in the engine frame 14. The splined connection 23—35, between the shafts 33—34 and the blower drive sprockets, constitutes not only an automatic connection when the blower unit is positioned on the frame but, due to the provision of suitable clearances between companion parts 23—35, niceties of machining and alignment of the blower casing and engine frame are obviated. It thus appears that without difficulty the entire blower unit may be removed from, or mounted upon, the end face of the frame casing 14, thus facilitating the removal of the operative blower units for inspection or service at any time.

While I have first described an assembly embodying a plurality of separate blower units, my preference, as caring for the scavenging air demand of engines of usual size, is to employ but a single blower of Roots type, which is or may be, in its essential elements, similar to those heretofore described. My further preference is to drive such a unit as suggested by Fig. 5, wherein there is shown an upper crankshaft 70 and a lower crankshaft 71. The upper shaft is provided, beyond its outermost bearing 72, with an overhung portion or extension to which is secured a chain sprocket 73, separate from the sprockets 74 and 75 through which, together with a chain 69, the power shafts 70 and 71 are operatively connected in timed relation.

Figure 5:
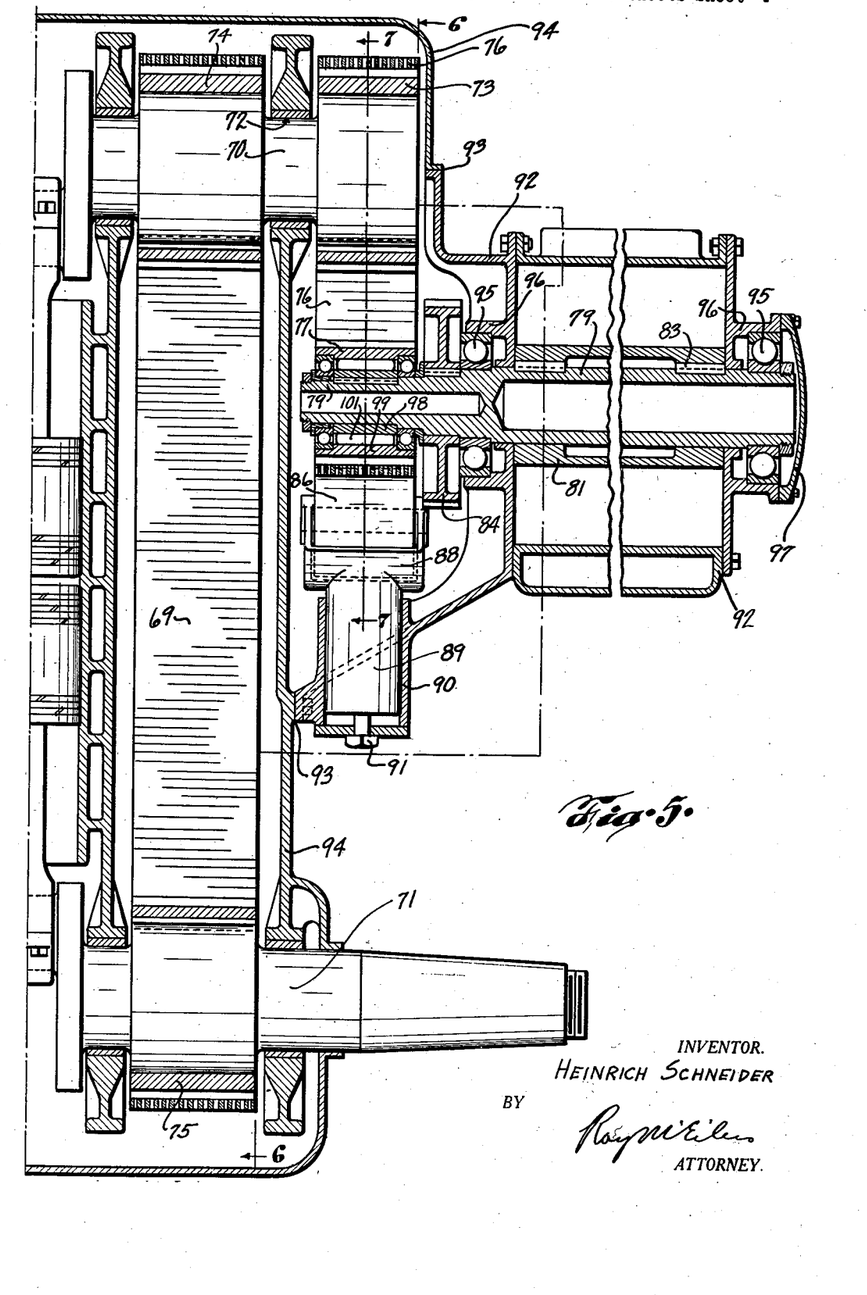
Fig. 5 is a fragmentary longitudinal section through one end of an internal combustion engine of opposed-piston type provided with a single air blower, being a preferred arrangement.
Figure 6:
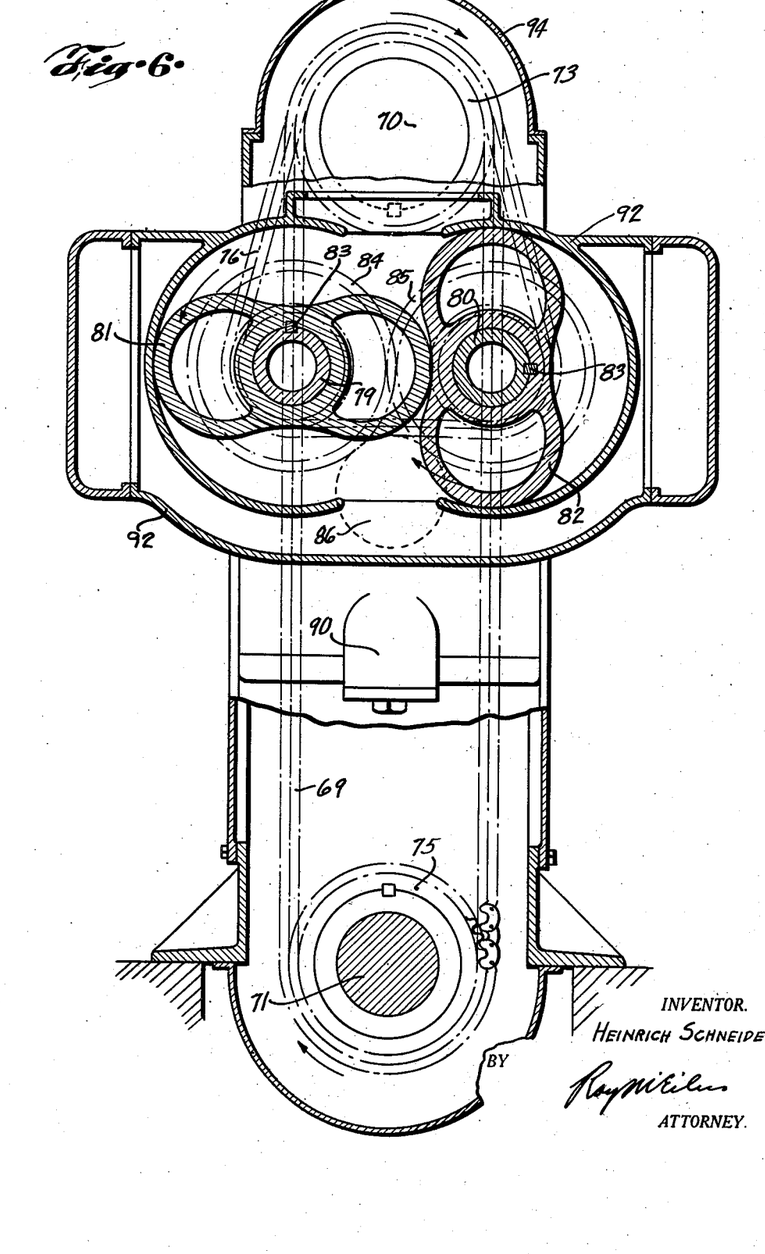
Fig. 6 is a transverse section as viewed along line 6—6 of Fig. 5.
Figure 7:
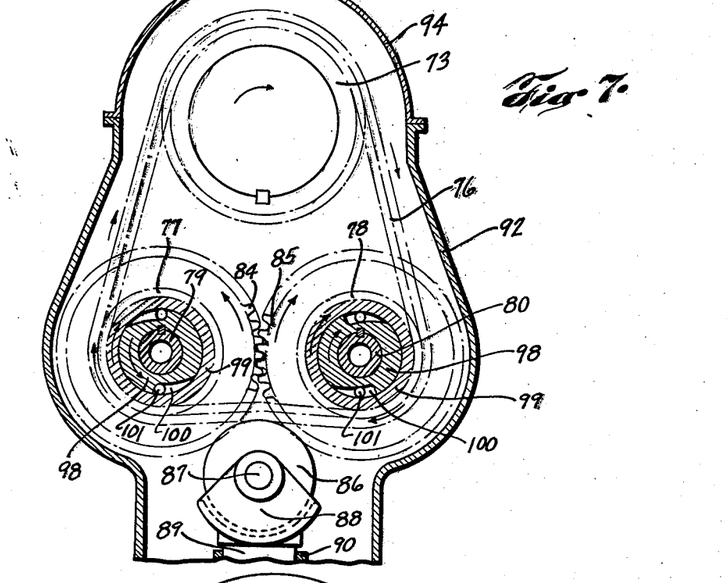
Fig. 7 is a fragmentary transverse section as viewed along line 7—7 of Fig. 5.

The sprocket 73 serves to receive a chain 76, preferably of the so-called silent type, this chain passing over and enmeshing with a pair of blower drive sprockets such as 77 and 78. The sprockets are mounted respectively, through means hereinafter described, on the blower shafts 79 and 80, the latter shafts serving respectively to carry blower impeller elements 81 and 82, which are secured as by keys 83 to the associated shafts. The impellers, as heretofore described, are timed or angularly positioned at 90 degress from each other, this timed relation being assured through a pair of enmeshing gears 84 on the shaft 79, and 85 on the shaft 80. The chain 76 is impelled by the sprocket 73 and in passing about the blower drive sprockets 77 and 78 passes over an idler roller 86, (Figs. 5 and 7). A stub shaft 87 serves rotatably to carry the idler roller 86, this shaft being supported by an adjustable yoke 88 formed as a part of or carried by a slide 89, for adjusting movement within a guide 90. Provision for movement of the slide 89 is cared for by a threaded element such as a screw 91, the head of which projects exteriorly of the guide housing 90 for reception of a wrench or like tool.

A housing is provided for the blower assembly of Fig. 5, as indicated at 92, and is detachably secured to seats 93 therefor, constituted by portions of the engine frame or end housing 94. The blower shafts and rotating elements are journalled, according to Fig. 5, in ball bearings 95, each carried in a suitable annular portion or flange 96 therefor conveniently formed integrally with the adjacent parts, such as the opposite end plates of the housing 92. Access to the outermost bearing 95 is provided for by a removable end cover 97 so as to permit inspection and lubrication.

As heretofore described with reference to Fig. 1, connection from the blower drive chain to the rotating blower elements is effected through paired unindirectional or overrun clutches, relatively oppositely disposed with respect to the two blower drive shafts. These unindirectional drive units include, according to Figs. 5 and 7, an inner member 98, each of which is keyed to its associated shaft, and a companion outer member 99, the inner members being provided with pockets 100 for the reception of rollers or balls 101. The relation of the pockets 100 and rolling elements 101 are such that, as appears from Fig. 7, as the chain 76 is impelled in a given direction, one of the unidirectional clutches will serve to transmit power to its associated blower shaft, while the companion unit will prevent any driving connection between its associated sprocket and shaft. From this it appears that, irrespective of whether the operation of chain 76 is clockwise or counter-clockwise, as viewed say in Fig. 7, the direction of rotation of the two blower shafts, and hence the impellers, will remain constant, although the companion shafts 79 and 80 are compelled to rotate in relatively opposite directions by reason of the enmeshing of gears 84 and 85.

As shown by Fig. 5, the entire blower assembly as here embodied, may be installed or removed as a complete operative unit, simply upon application or removal of cap screws or the like by which the casing is held to the seats 93 on the engine frame. That portion of the frame 94 overlying the sprocket 73 and chain 76 is preferably detachable to provide for access to these parts.

Figure 8:
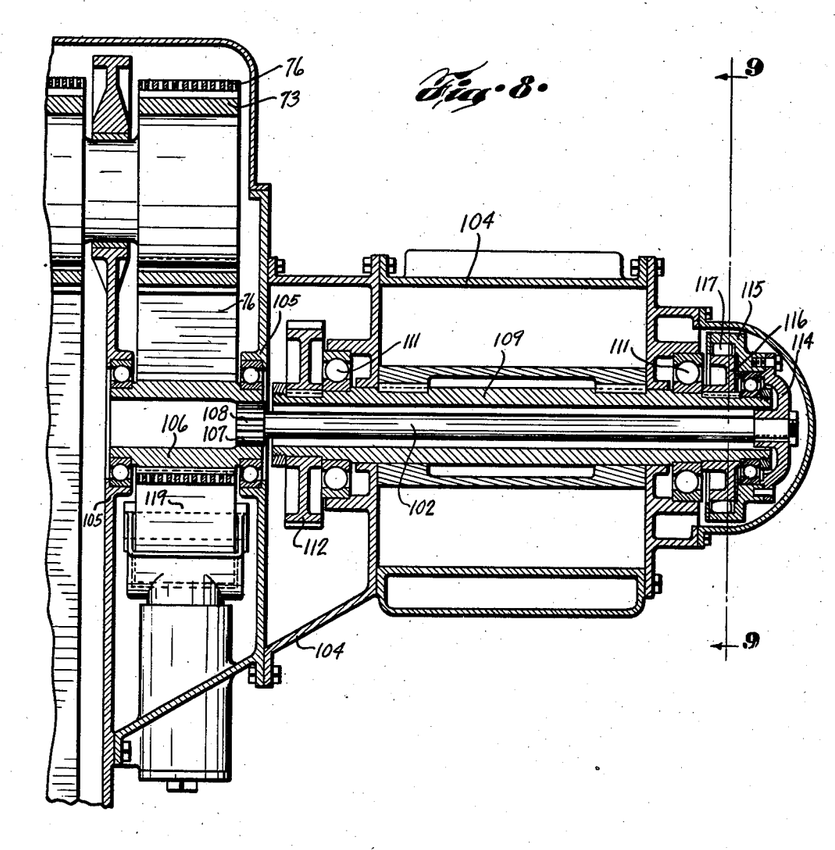
Fig. 8 is a fragmentary longitudinal section of a further modification of blower drive and mounting.
Figure 9:
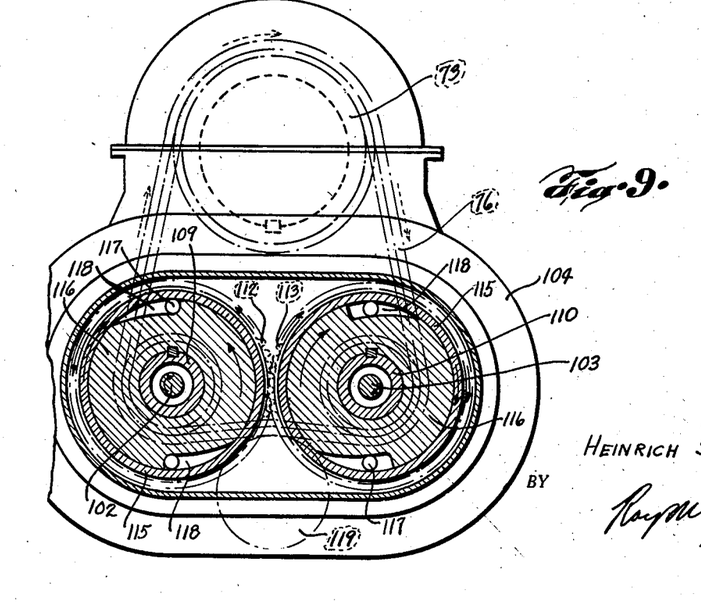
Fig. 9 is a view similar to Fig. 7, except as viewed along line 9—9 of Fig. 8.

While my preference is to locate the overrun clutch units as shown in Fig. 5, viz., at the inner ends of the blower shafts, and within the chain 76 since this tends to minimize the overall length of the engine and blower, it is of course entirely possible and offers certain advantages of access, to dispose the unidirectional or overrun units near the outer ends of the shafts as shown by Figs. 8 and 9. According to the latter arrangement, the blower impellers are driven by shafts 102 and 103 mounted in a housing structure 104, which may be composed of one or a plurality of sections, preferably detachably secured to the engine frame as in the examples previously discussed. As appears in Fig. 8, the engine frame or housing is provided with bearing portions 105 in which are journalled blower drive sprockets 106, each provided with an internally splined recess 107 for the reception of one of the splined driving heads 108 on the shafts 102 and 103, this mode of connection being somewhat similar to that between the elements 23 and 35 of Fig. 1, and offering the advantages thereof in assembly and mounting. Driving of the sprockets 106 may be effected through the crankshaft extension as shown by Fig. 5, carrying blower drive sprocket 73 and serving to actuate the silent chain 76.

In the example of Figs. 8 and 9, the driving connection to the blower impellers is effected through chain 76, the blower drive shafts 102 and 103, and sleeves 109 and 110 each journalled at its opposite ends in ball bearings such as 111, disposed in and carried by an annular flanged extension of the casing structure 104 in a manner similar to the showing of Fig. 1. Each of the sleeve elements 109—110 is connected as by a key, to one of the impeller members which are, as heretofore described, kept in timed relation by means of a pair of meshed gears 112 and 113, each keyed to one of the sleeves.

Similarly to the structure of Fig. 1, the outer ends of the shafts 102—103 are each provided with a spider 114 to which is detachably secured an outer overrunning clutch element 115, the companion or inner element 116 being secured to the associated sleeve. The structure and function of the overrunning clutch units are, or may be, identical with those heretofore described, connection between the clutch parts 115 and 116 being effected as through rollers 117 disposed in pockets 118, the inner unidirectional clutch elements, and hence the pockets, being relatively reversely arranged on the sleeves 109—110, so that their function is or may be identical with those previously described, except of course for the provision of a separate blower drive chain 76. An idler roller 119 is shown in Fig. 9, and may be similar to or identical with roller 86 of Fig. 7, and provided with similar adjusting expedients.

As previously noted in connection with Fig. 5, the relation of the overrun clutch units according to Figs. 8 and 9 is such that the chain 76, while serving to impel the blower drive sprockets 106 in one direction or the other responsively to reversal of the engine, nevertheless causes rotation of each of the blower sleeves 109—110 in constant directions, although the two sleeves will at any given time always rotate in opposite directions relative to each other.

As noted, my preference is to utilize for a single blower mounting and drive, the arrangement of Figs. 5 and 7, particularly on engines in which it is desirable to minimize the overall length, since the unidirectional clutch assemblies may be thus disposed internally of the chain. This construction has a further advantage of a reduction in weight and material, obviating the separate shaft and sleeve elements as well as the splined connection to the impeller drive sprockets. On the other hand the arrangement of Figs. 8 and 9, similarly to Fig. 1, somewhat facilitates assembly and removal of the blower.

A structural and operating advantage, except for some additional overall length, is attained in the embodiments of Figs. 5–9, as compared with those of Figs. 1–4, since the separate blower drive chain obviates any undesirable deflection of the crankshaft timing chain, and provides a somewhat greater area of contact between the chain and blower sprockets.

The invention has been described by making particularized reference to a scavenging air blower assembly and drive for use on a two cycle engine, such as one of Diesel type. It will be understood, however, that the description is merely illustrative, and that the principles of the invention are applicable, with or without minor changes, to the drive of other engine adjuncts or auxiliary apparatus, and that the embodiments illustrated are susceptible of change within the scope of the appended claims.

I claim as my invention:

1. In combination with a unidirectional machine adapted to be driven by a reversible prime mover and including two oppositely rotating driven elements, a member arranged to be driven by the prime mover, a pair of gear elements connecting said oppositely rotating elements, an overrun clutch unit for each of said oppositely driven elements, the units being oppositely related to the respective elements, and arranged for actuation by the first said driven member.

2. In combination with a unidirectional fluid displacement device of a type embodying two oppositely rotating driven elements, gears connecting said elements, a unidirectional clutch unit of automatic type, for each of said elements, the clutch units being oppositely related to the elements, and a member operatively connected to both units, and arranged to be driven by a reversible prime mover.

3. In combination in a unidirectional fluid displacement machine, a pair of shafts, gears connecting said shafts in timed relation for opposite rotation, an overrun clutch associated with each gear, and means for connecting said clutches to a reversible prime mover.

4. In a unidirectional machine and drive for use with a reversible prime mover having a power shaft, a pair of driven shafts, a unidirectional clutch of automatic type, carried by each driven shaft, the clutches being oppositely disposed, relatively to the paired shafts, driven fluid displacement members associated with the paired shafts and actuated through the unidirectional clutches, gearing connecting the driven shafts for rotation in relatively opposite directions, and means for actuating said machine by the power shaft of the associated prime mover.

5. The combination in a unidirectional fluid displacement machine of a type adapted to be driven by a reversible prime mover and having at least one moving element, of a connecting drive assembly including a chain powered by the prime mover, a pair of sprockets carried by the machine and engaged by the internal faces of said chain, connections from said sprockets to said moving element including a pair of overrun clutches, each clutch being disposed internally of its associated sprocket, and means for detachably mounting the machine and sprockets, as an assembled operative unit, on the frame structure of the associated prime mover.

6. A unidirectional blower and blower drive assembly adapted to be driven by a reversible prime mover, the assembly including a Roots type blower, having oppositely rotating impeller elements, a chain adapted to be driven by the associated prime mover, a pair of drive sprockets and shafts for the blower, the paired sprockets being arranged for rotation in corresponding directions by the chain, and a pair of overrun clutches each arranged to connect one of the paired sprockets to one of the blower elements, the clutches being oppositely related to their associated shafts, whereby each impeller of the unit is unidirectionally operated irrespective of the direction of rotation of said chain, the blower including gearing operatively connecting its impellers for rotation in opposite directions.

7. A machine adapted to be utilized with a reversible engine having two power shafts, the machine being characterized by a unidirectionally operable fluid displacement element, and arranged to be disposed between the center lines of said shafts, a chain disposed to be actuated by at least one of said shafts, a pair of drive sprockets for said machine, engaged by said chain, means disposed operatively between the sprockets and the unidirectionally movable element for maintaining the unidirectional operation of said element irrespective of the direction of rotation of the chain.

8. An air blower and blower drive assembly adapted for use with a reversible prime mover, the assembly including a blower unit of Roots type, a drive chain, a pair of sprockets carried by the blower unit and projecting inwardly of the chain so as to be engaged by the internal faces thereof, connections from the sprockets to the blower displacement elements including an overrun clutch for each element, each clutch being disposed internally of its associated sprocket.

9. An air blower and blower drive assembly adapted for use with a reversible prime mover, the assembly including a blower unit of Roots type, a drive chain, a pair of sprockets carried by the blower unit and engaged by said chain and projecting inwardly of the chain so as to be engaged by its internal faces, connections from the sprockets to the blower displacement elements including an overrun clutch for each element, each clutch being disposed internally of its associated sprocket, and means for detachably mounting the blower and sprockets as an assembled operative unit, on the frame structure of the associated prime mover.

10. In combination in a charging air blower of a type having at least one rotatable impeller element, and a blower drive assembly, a pair of drive sprockets on said blower, a chain interconnecting said sprockets, a pair of hollow shafts of which at least one constitutes a mounting for an impeller element of the blower, gearing connecting the hollow shafts, a pair of driven elements extending through the hollow shafts and each connected to one of the sprockets, and an overrun clutch connecting each of said driven elements to its associated hollow shaft, said clutches being disposed in relatively opposite operative relation between the associated driven elements and hollow shafts.

11. In combination in a blower having at least one impeller element, and a drive assembly therefor, a pair of blower drive sprockets, a drive chain interconnecting said sprockets, a pair of relatively oppositely disposed overrun clutches through which the blower drive sprockets are connected to the blower impeller element, a rotatable idler element disposed between the blower drive sprockets, and means for adjusting the position of the idler element, to vary the tension of said chain.

12. A blower of unidirectional type adapted to be driven by a reversible prime mover, including two sprockets, at least one rotatable impeller element, a pair of hollow shafts of which at least one constitutes a mounting for said impeller element, gearing connecting the hollow shafts, a pair of driven elements extending through the hollow shafts and each connected to one of the sprockets, and an overrun clutch connecting each of said driven elements to an associated hollow shaft, the overrun clutches being disposed in relatively opposite operative relation between the associated elements and shafts.

13. A blower assembly of Roots type, adapted for operative combination with a reversible prime mover, and including a pair of hollow shafts by which the blower impeller elements are carried, a drive shaft extending through each of the hollow shafts, a sprocket operatively connected to each of the drive shafts, a chain adapted for connection to the prime mover and arranged to actuate the sprockets in corresponding directions, and a pair of relatively oppositely disposed unidirectional clutch units, each unit serving to connect one of the drive shafts to the associated hollow shaft.

14. An air blower and blower drive assembly for use with a reversible prime mover, the assembly including two blower units each having at least one impeller element, a drive chain arranged to be operatively connected to the prime mover, a pair of sprockets for each blower unit, means including drive-shafts connecting the sprockets with the blower impellers, the paired sprockets of the two units being arranged for corresponding rotation by the chain, and an overrun clutch arranged to connect each drive shaft to an impeller element in such manner that each blower unit is unidirectionally operated irrespective of the direction of rotation of said chain.

15. In combination, a pair of blower units adapted to be driven by a prime mover characterized by two chain-connected shafts, the blower being disposed between the center lines of the shafts, a pair of sprockets for each unit, the sprockets engaging the internal face of the chain, means for adjusting the angularity of the chain with respect to certain of the said sprockets, and means disposed operatively between the sprockets and the driven elements of the blowers for automatically maintaining operation of each of said blowers in a given direction, irrespective of the direction of rotation of the chain.

16. An air blower and blower-drive assembly including two blower units, and adapted to be driven by a prime mover of reversible type, each unit having at least one impeller and embodying a flanged blower casing for detachable securement to a frame or housing structure of the associated prime mover, a drive chain, a pair of sprockets and drive shafts for each blower unit, means including a drive-shaft connecting each sprocket with a blower impeller, the paired sprockets of the two units being arranged for corresponding rotation by the chain, unidirectional clutch means arranged to connect each drive shaft to an impeller in such manner that each blower unit is unidirectionally operated irrespective of the direction of rotation of said chain, the drive shafts projecting endwise of the blower unit to an extent to be extended inwardly of the frame, and the ends of the drive shafts and the associated sprockets being provided with the splined connections whereby the drive shafts are operatively connected to the sprockets upon positioning the assembly in predetermined relation to the associated frame.

HEINRICH SCHNEIDER.